United States Patent
Kawarada

(10) Patent No.: US 8,531,587 B2
(45) Date of Patent: Sep. 10, 2013

(54) IMAGE PICKUP APPARATUS THAT PROVIDES FOCUS CONTROL BASED ON FOCUSING INFORMATION OBTAINED FROM AN INTERCHANGEABLE LENS

(75) Inventor: Masahiro Kawarada, Tokyo (JP)

(73) Assignee: Canon Kabushiki Kaisha (JP)

(*) Notice: Subject to any disclaimer, the term of this patent is extended or adjusted under 35 U.S.C. 154(b) by 383 days.

(21) Appl. No.: 12/636,384

(22) Filed: Dec. 11, 2009

(65) Prior Publication Data
US 2010/0157134 A1 Jun. 24, 2010

(30) Foreign Application Priority Data
Dec. 12, 2008 (JP) ................. 2008-316330

(51) Int. Cl.
*H04N 5/225* (2006.01)
*H04N 5/232* (2006.01)
*G03B 3/00* (2006.01)

(52) U.S. Cl.
USPC ................ 348/360; 348/353; 396/89

(58) Field of Classification Search
USPC ............... 348/345, 360, 349, 353, 354, 355, 348/365, 296, 297; 396/79, 89
See application file for complete search history.

(56) References Cited

U.S. PATENT DOCUMENTS

| | | | |
|---|---|---|---|
| 5,140,357 A | 8/1992 | Suda et al. | |
| 6,999,684 B2 * | 2/2006 | Sato et al. | 396/135 |
| 7,831,138 B2 * | 11/2010 | Nakahara | 348/349 |
| 8,035,726 B2 * | 10/2011 | Matsumoto et al. | 348/356 |
| 2008/0199170 A1 * | 8/2008 | Shibuno et al. | 396/125 |
| 2008/0267601 A1 * | 10/2008 | Kobayashi | 348/345 |

FOREIGN PATENT DOCUMENTS

| | | | |
|---|---|---|---|
| JP | 06-006660 | * | 1/1994 |
| JP | 06-006660 A | | 1/1994 |
| JP | 6-141223 A | | 5/1994 |
| JP | 2821214 B2 | | 11/1998 |
| JP | 2002-072073 A | | 3/2002 |
| JP | 2008-015274 A | | 1/2008 |
| JP | 2008-292541 A | | 12/2008 |

OTHER PUBLICATIONS

JP Office Action issued Jul. 24, 2012 for corresponding JP2008316330.

* cited by examiner

*Primary Examiner* — Nhan T Tran
(74) *Attorney, Agent, or Firm* — Rossi, Kimms & McDowell LLP

(57) ABSTRACT

An image pickup apparatus which is capable of accurately acquiring evaluation values at target positions for contrast evaluation value acquisition to thereby suppress degradation of accuracy of autofocus due to skipping the reading of a contrast evaluation value at an in-focus position and an increase in autofocus time. The image pickup apparatus acquires from an interchangeable lens at least one of a drivable defocus amount of the interchangeable lens, and a driving speed in driving of a focus lens to focus adjustment positions. The image pickup apparatus changes a lens driving method for focus detection, based on at least one of the drivable defocus amount, the driving speed, and a charge storage interval for charge storage in an image pickup element for acquiring a signal for use in focus detection.

6 Claims, 9 Drawing Sheets

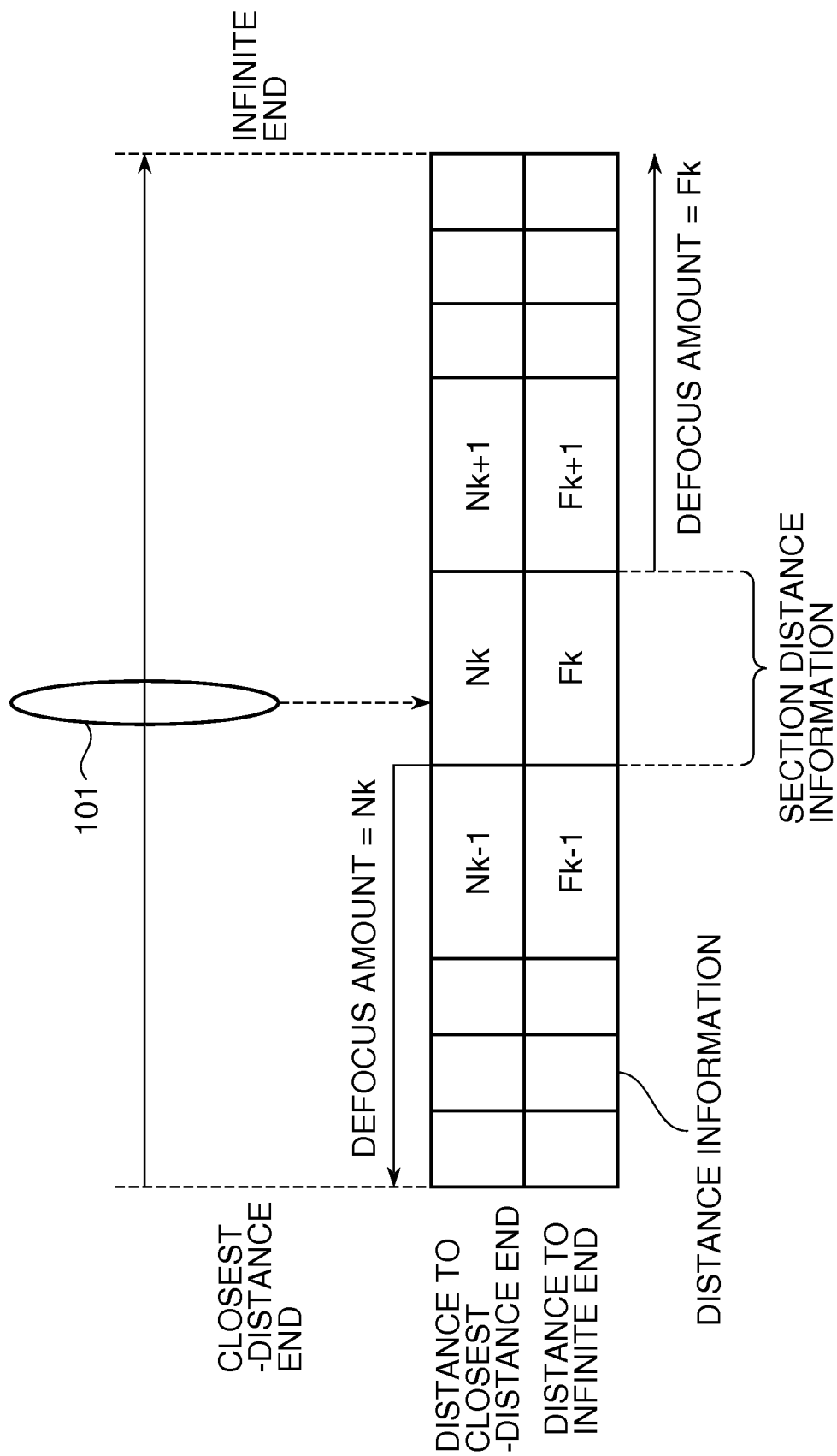

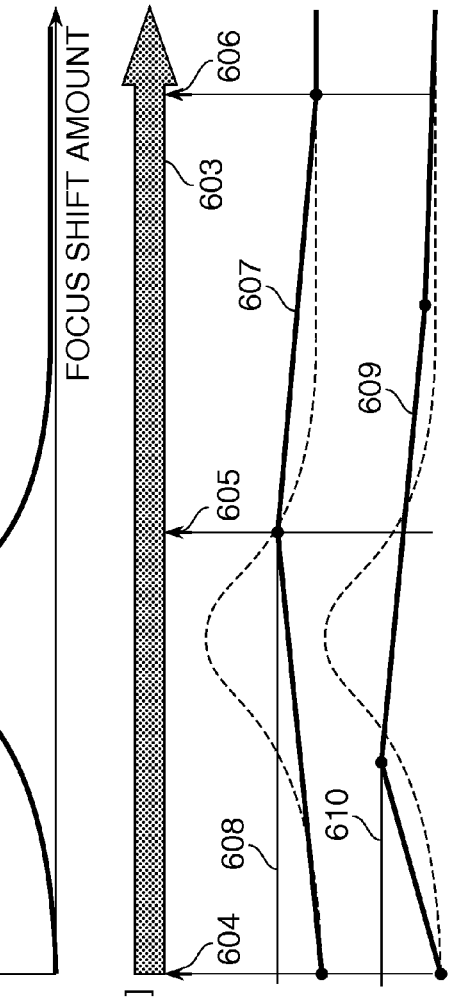
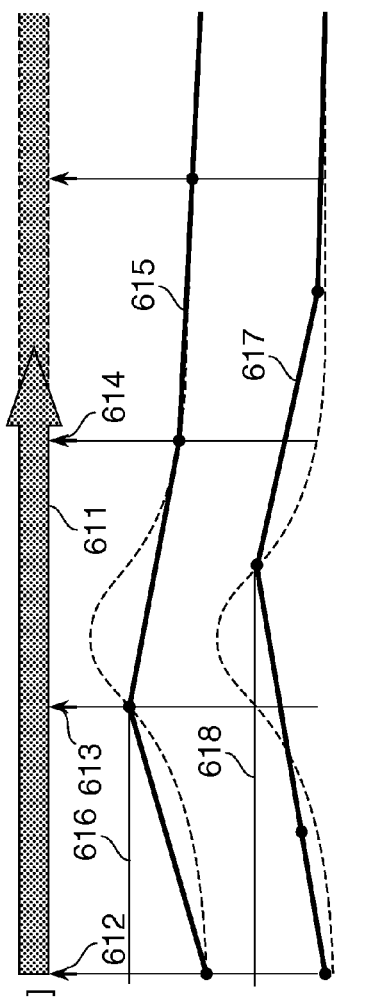
FIG.6A (PRIOR ART)
FIG.6B (PRIOR ART)
FIG.6C (PRIOR ART)

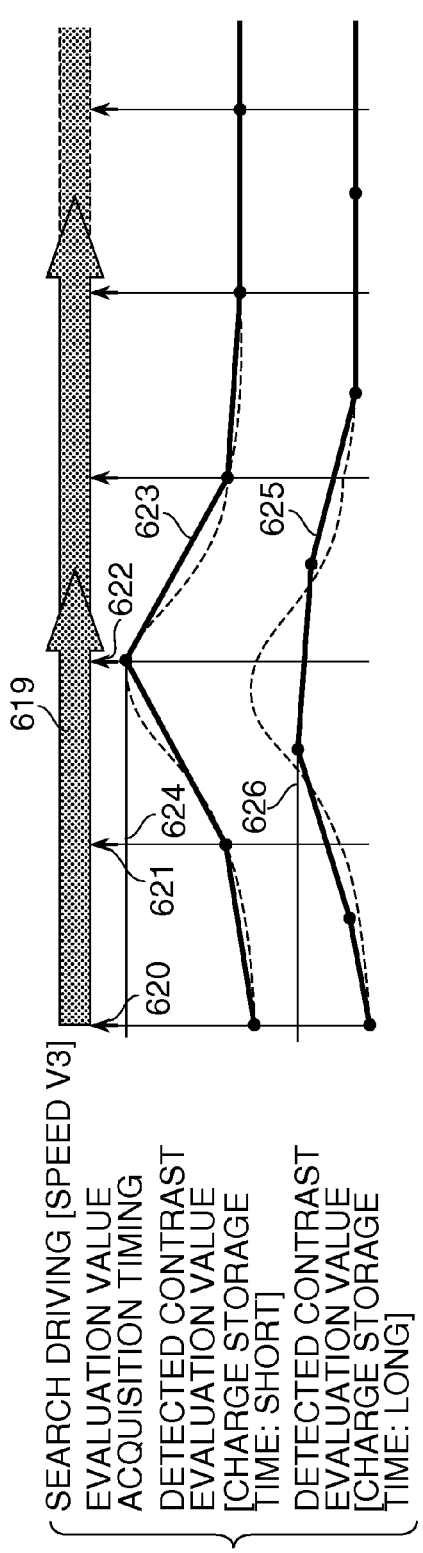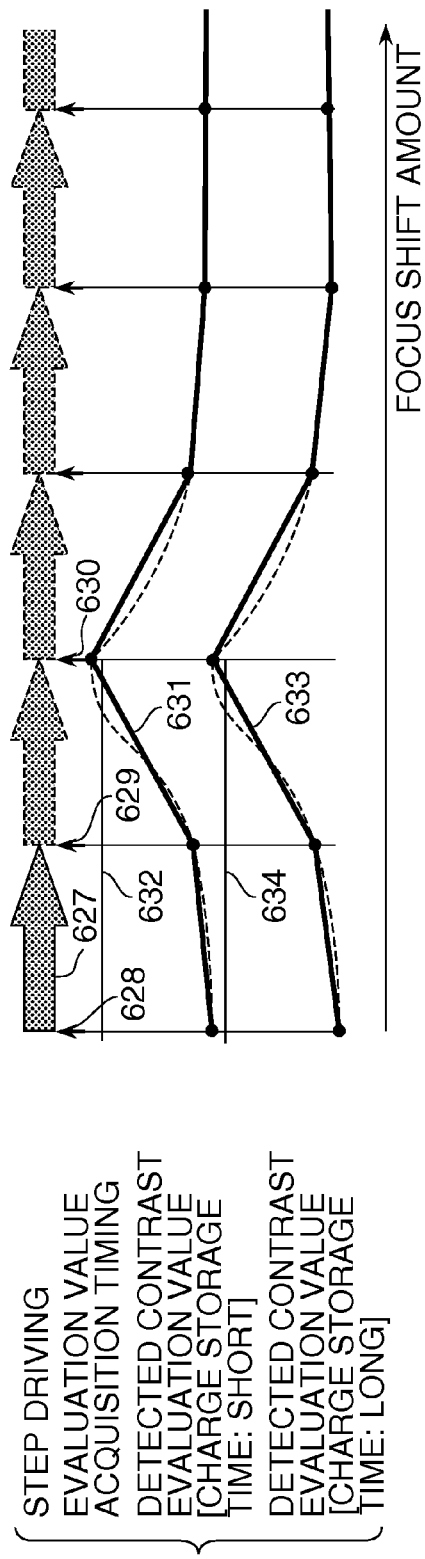

IMAGE PICKUP APPARATUS THAT PROVIDES FOCUS CONTROL BASED ON FOCUSING INFORMATION OBTAINED FROM AN INTERCHANGEABLE LENS

BACKGROUND OF THE INVENTION

1. Field of the Invention

The present invention relates to a lens-interchangeable image pickup apparatus provided with a focus detecting function.

2. Description of the Related Art

A technique called a contrast type method (a hill-climbing method or a TV-AF method) has been employed for AF (autofocus). In the contrast type method, the contrast of a picked-up image obtained in each driving stage is acquired as an evaluation value while driving a focus lens included in a photographic lens or an image pickup element in an optical axis direction. Then, a lens position corresponding to the highest evaluation value is defined as an in-focus position. The contrast type AF is described in detail e.g. in Japanese Patent No. 2821214.

In the contrast type AF, evaluation values each calculated from high-frequency components of an object image are acquired at a plurality of focus adjustment positions, respectively, whereby an in-focus position is determined. At this time, the method of driving a lens for shifting the focus adjustment position includes a method of temporarily stopping the driving of the lens at each target position for acquiring an evaluation value (see e.g. Japanese Patent Laid-Open Publication No. H06-141223) and a method of acquiring evaluation values while continuing the driving of the lens (see e.g. Japanese Patent Laid-Open Publication No. 2002-72073). Hereinafter, the former method will be referred to as "the step driving method", and the latter as "the search driving method".

In the step driving method, an evaluation value is acquired at each drive stop position while intermittently performing lens driving by a relatively small defocus amount. The step driving method is advantageous in that focus adjustment positions where a lens is to be stopped at completion of lens driving are predetermined, and hence an evaluation value can be reliably acquired at each predetermined focus adjustment position. However, lens driving by a small defocus amount requires a time period for acceleration or deceleration occurs, and therefore it takes longer time before completion of lens driving than in a case where lens driving is performed by a fixed defocus amount at a fixed speed.

In the search driving method, evaluation values are each acquired at predetermined intervals of time dependent on the charge storage interval of a sensor for use in focus detection while continuously performing lens driving to thereby continuously change the focus adjustment position. The search driving method is advantageous in that the acceleration or deceleration of lens driving is not sharp except at the start and end of the lens driving, which makes shorter the time required for lens driving between two evaluation value acquisition positions than in the step driving method. However, assuming that the charge storage interval is fixed, an evaluation value acquisition distance interval increases with an increase in the lens driving speed.

FIGS. 6A to 6E are schematic diagrams for comparison of evaluation value acquisition timings and detected evaluation values between the step driving method and the search driving method.

FIG. 6A shows an example of an output level of an evaluation value of an object which varies with the focus adjustment position. Reference numeral 601 denotes a waveform representing the output of the evaluation value. The horizontal axis represents the focus adjustment position, and the vertical axis represents the level of a contrast evaluation value dependent on the focus adjustment position. Reference numeral 602 denotes an auxiliary line showing the output peak level of the evaluation value.

FIG. 6B shows evaluation value acquisition timings and evaluation values to be detected in a case where the focus lens is search-driven at a speed V1. Reference numeral 603 denotes a defocus amount by which the focus lens is advanced per unit time during search driving performed at the speed V1. Arrows 604, 605, and 606 indicate the respective evaluation value acquisition timings in the search driving performed at the speed V1. Reference numeral 607 denotes changes in the evaluation value to be detected during the search driving performed at the speed V1 in a case where the charge storage time period of the sensor for focus detection is set to be short and electric charge is stored at a focus adjustment position immediately before the associated evaluation value acquisition timing. Reference numeral 608 denotes an auxiliary line indicating the output peak level of the evaluation value 607. Reference numeral 609 denotes changes in the evaluation value to be detected during the search driving performed at the speed V1 in a case where the charge storage time period of the sensor for focus detection is set to a length approximately equal to an evaluation acquisition time interval and an approximately intermediate point between two adjacent ones of the evaluation value acquisition timings corresponds to the center of gravity in terms of charge storage in focusing. Reference numeral 610 denotes an auxiliary line indicating the output peak level of the evaluation value 609. It should be noted that in FIG. 6B, a broken line shows the waveform 601 representing the output of the evaluation value. As shown in FIG. 6B, as the charge storage time period becomes shorter, values which are more instantaneous in changes in evaluation values are detected. Further, when the focus lens is search-driven at the speed V1, the evaluation value acquisition distance interval is increased, and hence an evaluation value considerably lower than the output peak level 602 of the contrast evaluation value of an object is more likely to be detected.

FIG. 6C shows evaluation value acquisition timings and evaluation values to be detected in a case where the focus lens is search-driven at a speed V2 lower than the speed V1. Reference numeral 611 denotes a defocus amount by which the focus lens is advanced per unit time during search driving performed at the speed V2. Arrows 612, 613, and 614 indicate the respective evaluation value acquisition timings in the search driving performed at the speed V2. Reference numeral 615 denotes changes in the evaluation value to be detected during the search driving performed at the speed V2 in a case where the charge storage time period of the sensor for focus detection is set to be short and electric charge is stored at a focus adjustment position immediately before the associated evaluation value acquisition timing. Further, reference numeral 616 denotes an auxiliary line indicating the output peak level of the evaluation value 615. Reference numeral 617 denotes changes in the evaluation value to be detected during the search driving performed at the speed V2 in a case where the charge storage time period of the sensor for focus detection is set to a length approximately equal to an evaluation acquisition time interval and an approximately intermediate point between two adjacent ones of the evaluation value acquisition timings corresponds to the center of gravity in terms of charge storage in focusing. Reference numeral 618 denotes an auxiliary line indicating the output peak level of the evaluation value 617. It should be noted that in FIG. 6C, a broken line shows the waveform 601 representing the output of the evaluation value. As shown in FIG. 6C, as search driving speed is lower, the evaluation value acquisition interval on a focus axis becomes shorter, which makes it possible to more easily detect an evaluation value close to the output peak level 602 of the contrast evaluation value of an object.

FIG. 6D shows evaluation value acquisition timings and evaluation values to be detected in a case where the focus lens is search-driven at a speed V3 still lower than the speed V2. Reference numeral 619 denotes a defocus amount by which the focus lens is advanced per unit time during search driving performed at the speed V3. Arrows 620, 621, and 622 indicate the respective evaluation value acquisition timings in the search driving performed at the speed V3. Reference numeral 623 denotes changes in the evaluation value to be detected during the search driving performed at the speed V3 in a case where the charge storage time period of the sensor for focus detection is set to be short and electric charge is stored at a focus adjustment position immediately before the associated evaluation value acquisition timing. Reference numeral 624 denotes an auxiliary line indicating the output peak level of the evaluation value 623. Reference numeral 625 denotes changes in the evaluation value to be detected during the search driving performed at the speed V3 in a case where the charge storage time period of the sensor for focus detection is set to a length approximately equal to an evaluation acquisition time interval and an approximately intermediate point between two adjacent ones of the evaluation value acquisition timings corresponds to the center of gravity in terms of charge storage in focusing. Reference numeral 626 denotes an auxiliary line indicating the output peak level of the evaluation value 625. It should be noted that in FIG. 6D, a broken line shows the waveform 601 representing the output of the evaluation value. As shown in FIG. 6D, when search driving speed is further lower, if the charge storage time period is short, the evaluation value level close to the output peak level 602 of the contrast evaluation value of an object can be detected more easily as an instantaneous value of the changing evaluation value.

FIG. 6E shows evaluation value acquisition timings and evaluation values to be detected in a case where the focus lens is step-driven. In FIG. 6E, the amount of step driving is depicted such that it coincides with the defocus amount by which the focus lens is advanced over a time period corresponding to the evaluation value acquisition time interval during search driving performed at the speed V3. Reference numeral 627 denotes a defocus amount by which the focus lens is advanced by one-time step driving. Arrows 628, 629, and 630 indicate the respective evaluation value acquisition timings in the step driving, and corresponds to respective stop positions of the focus lens in the step driving. Reference numeral 631 denotes changes in the evaluation value to be detected during the step driving in a case where the charge storage time period of the sensor for focus detection is set to be short and electric charge is stored at a focus adjustment position immediately before the associated evaluation value acquisition timing. Reference numeral 632 denotes an auxiliary line indicating the output peak level of the evaluation value 631. Reference numeral 633 denotes changes in the evaluation value to be detected during the step driving in a case where the charge storage time period of the sensor for focus detection is set to a length approximately equal to an evaluation acquisition time interval and an approximately intermediate point between two adjacent ones of the evaluation value acquisition timings corresponds to the center of gravity in terms of charge storage in focusing. Reference numeral 634 denotes an auxiliary line indicating the output peak level of the evaluation value 633. It should be noted that in FIG. 6E, a broken line shows the waveform 601 representing the output of the evaluation value. As shown in FIG. 6E, in the case of the step driving, each evaluation value is acquired after completion of lens driving, and hence the same evaluation value is detected irrespective of the length of the charge storage time period. Further, in the step driving, a charge storage result is acquired at the position where lens driving is completed, so that the focus lens is at rest at a position where lens driving is completed, during the charge storage time period. Therefore, the same evaluation value can be obtained irrespective of the length of the charge storage time period.

As described above, in the case of acquiring evaluation values while continuously driving the focus lens by the search driving method, the detected evaluation value level changes according to the speed of driving of the focus lens and the charge storage time period of the sensor for focus detection. On the other hand, in the case of acquiring evaluation values by the step driving method, i.e. acquiring an evaluation value each time lens driving is stopped, each detected evaluation value level changes according to the amount of step driving.

In a case where the lens-interchangeable image pickup apparatus performs the contrast type AF by the search driving method, the speed of driving of the focus lens becomes too high depending on a mounted interchangeable lens, so that it sometimes occurs that an evaluation value cannot be acquired at a target position. When the speed of driving of the focus lens is too high, causing an increase in the evaluation value acquisition distance interval, it becomes impossible to acquire an evaluation value at a focus adjustment position where high contrasts around an in-focus position can be obtained, which makes it impossible to detect the in-focus position properly. In this case, the output peak level of the evaluation value is detected to be low, which can degrade the accuracy of autofocus due to erroneous determination of an in-focus position. Further, there is a fear that the focus lens can continue searching for an in-focus position even after having passed the in-focus position, which causes an increase in autofocus time.

SUMMARY OF THE INVENTION

The present invention provides an image pickup apparatus which is capable of accurately acquiring evaluation values at target positions for contrast evaluation value acquisition to thereby suppress degradation of accuracy of autofocus due to skipping the reading of a contrast evaluation value at an in-focus position and an increase in autofocus time.

The present invention provides a lens-interchangeable image pickup apparatus having a focus detection unit for detecting an in-focus position for an object based on contrast evaluation values, comprising an acquisition unit configured to acquire from an interchangeable lens at least one of a drivable defocus amount and a driving speed associated with a focus adjustment position of a focus lens, and a changing unit configured to change a lens driving method for focus detection, based on at least one of the drivable defocus amount, the driving speed, and a charge storage interval for charge storage in a sensor for acquiring a signal for use in focus detection.

Further features of the present invention will become apparent from the following description of exemplary embodiments (with reference to the attached drawings).

BRIEF DESCRIPTION OF THE DRAWINGS

FIG. 2 is a schematic diagram useful in explaining distance information used in the digital camera as the image pickup apparatus according to the embodiment of the present invention.

FIGS. 6A to 6E are schematic diagrams for comparison of evaluation value acquisition timings and detected evaluation values between a step driving method and a search driving method.

DETAILED DESCRIPTION OF THE EMBODIMENTS

The present invention will now be described in detail below with reference to the accompanying drawings showing an embodiment thereof.

Figure 1A:
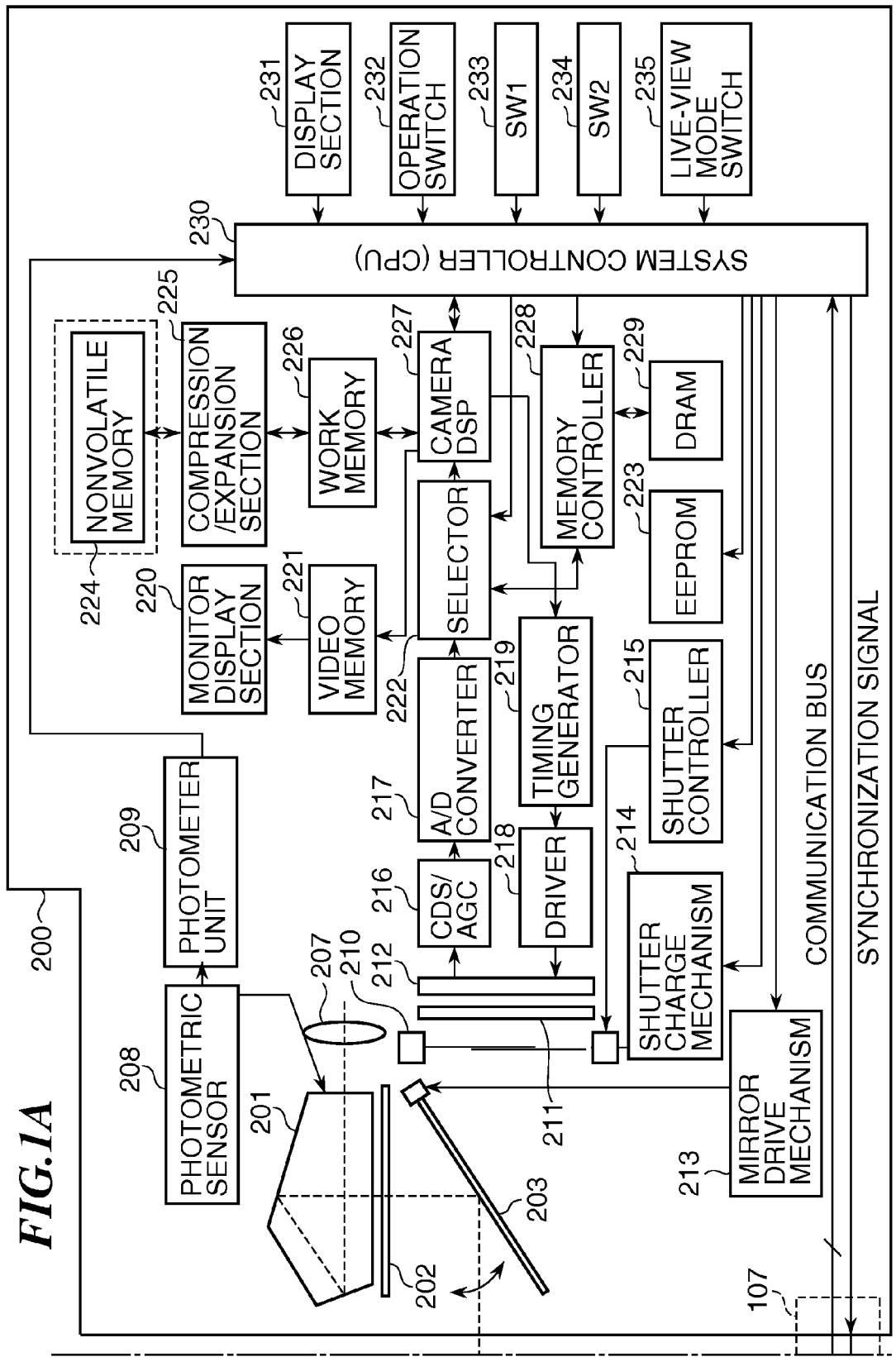
FIGS. 1A and 1B are a block diagram of a digital camera as an image pickup apparatus according to an embodiment of the present invention.
Figure 1B:
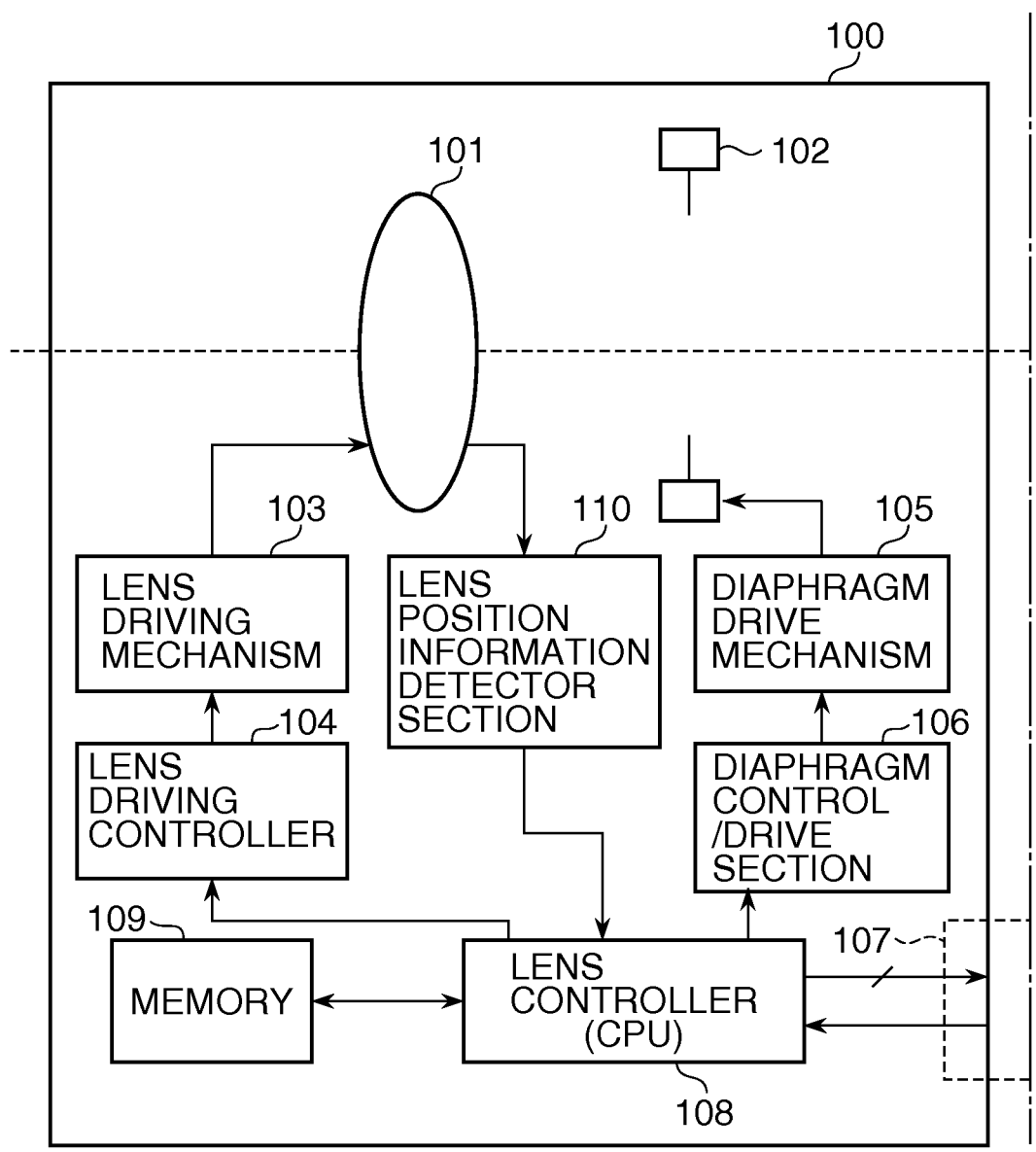

FIGS. 1A and 1B are a block diagram of a digital camera implementing an image pickup apparatus according to the embodiment of the present invention.

As shown in FIGS. 1A and 1B, an interchangeable photographic lens 100 is removably mounted to a camera main unit 200 of the digital camera of the present embodiment via a lens mount mechanism of a mount section, not shown. The mount section is provided with an electrical contact unit 107. The electrical contact unit 107 has a terminal for a communication bus line including a communication clock line, a data transmission line, and a data reception line. These enable communication between the camera main unit 200 and the photographic lens 100. The camera main unit 200 communicates with the photographic lens 100 via the electrical contact unit 107 to thereby control driving of a focus lens 101 included in the photographic lens 100 and a diaphragm 102 for adjusting a light amount. Although only the focus lens 101 is shown as a lens within the photographic lens 100 in FIG. 1B, a variable power lens, a fixed lens, and so forth are also provided in the photographic lens 100, and a lens unit comprises the lenses.

The electrical contact unit 107 is provided with not only the communication bus line, but also a synchronization signal line via which image storage timing is transmitted from the camera main unit 200 to the photographic lens 100.

A light flux, not shown, from an object, not shown, is guided to a quick return mirror 203 within the camera main unit 200 via the lens unit including the focus lens 101 and the diaphragm 102 in the photographic lens 100. The quick return mirror 203 is disposed in a photographic optical path in oblique relation to an optical axis such that the quick return mirror 203 can be moved to a first position (shown in FIG. 1) for guiding the light flux from the object upwardly to a finder optical system or to a second position for retreat from the photographic optical path.

The light flux reflected on the quick return mirror 203 passes through a finder screen 202 existing on a focal plane, and the finder optical system formed by a pentaprism 201 and an eyepiece 207, to reach a photographer's eye.

When the quick return mirror 203 is moved up to the second position (i.e. retreated from the photographic optical path), a light flux from the photographic lens 100 reaches an image pickup element 212 via a focal plane shutter 210 as a mechanical shutter and an optical filter 211. The optical filter 211 has a function of cutting off infrared rays and guiding only visible rays to the image pickup element 212 as well as a function as an optical low-pass filter. The focal plane shutter 210 has a front curtain and a rear curtain to control transmission and shielding of a light flux from the photographic lens 100.

It should be noted that when the quick return mirror 203 is moved up to the second position, a submirror (not shown) is also retreated from the photographic optical path in a state folded with respect to the quick return mirror 203. The quick return mirror 203 is moved up to the second position not only for still image shooting, but also for live view.

The camera main unit 200 of the digital camera according to the present embodiment includes a system controller 230 that controls the overall operation of the digital camera. The system controller 230 is implemented e.g. by a CPU or an MPU, and controls the operations of circuits etc. referred to hereinafter. The system controller 230 communicates with a lens controller 108 in the photographic lens 100 using the communication bus line via the electrical contact unit 107. Similarly to the system controller 230, the lens controller 108 is implemented e.g. by a CPU or an MPU, and controls the operations of circuits etc. in the photographic lens 100.

In communication between the system controller 230 and the lens controller 108, a command for driving or stopping the focus lens 101, the amount of driving the same and a required driving speed, the amount of driving the diaphragm 102, and requests for sending various lens-side data are transmitted from the system controller 230. On the other hand, the lens controller 108 transmits status information indicative of whether or not the focus lens 101, the diaphragm 102, and so forth are being driven, and various lens-side parameters, such as an open F-value, a focal length, and a settable driving speed.

In focus control, the system controller 230 communicates instructions concerning a lens driving direction, a lens driving amount, and a lens driving speed to the lens controller 108. Upon reception of a lens driving command from the system controller 230, the lens controller 108 causes a lens driving controller 104 to control a lens driving mechanism 103 for driving the focus lens 101 in the optical axis direction to perform focusing. The lens driving mechanism 103 has a stepper motor or a DC motor as a drive source.

Upon reception of a diaphragm driving command from the system controller 230, the lens controller 108 causes a diaphragm control/drive section 106 to control a diaphragm drive mechanism 105 for driving the diaphragm 102, to thereby drive the diaphragm 102 up to a designated value.

The system controller 230 is also connected to a shutter controller 215, a photometer unit 209 to which is connected a photometric sensor 208, a mirror drive mechanism 213, and a shutter charge mechanism 214. The shutter controller 215 drivingly controls travel of the front and rear curtains of the focal plane shutter 210 according to a signal from the system controller 230. Further, the system controller 230 sends a lens driving command to the lens controller 108 to control the lens driving mechanism 103 via the lens driving controller 104. This causes an object image to be formed on the image pickup element 212.

A camera DSP 227 incorporates a circuit block for contrast value calculation for the contrast type AF, a circuit block for motion vector calculation for detection of the motion of an object, and a circuit block for determining the display size and position of an AF frame. These circuit blocks will be described in detail hereinafter. Connected to the camera DSP 227 are a timing generator 219, and an A/D converter 217 via a selector 222. A video memory 221 and a work memory 226 are also connected to the camera DSP 227.

The image pickup element 212 is driven by an output from a driver 218 that controls horizontal driving and vertical driving on a pixel-by-pixel basis based on a signal from the timing generator 219 that determines timing for the overall operation of the digital camera. This causes the image pickup element 212 to photoelectrically convert an object image into image signals and outputs the generated image signals. Output from the A/D converter 217 is input to a memory controller 228 via the selector 222 that selects a signal based on a signal from the system controller 230, and all transferred to a DRAM 229 as a frame memory.

In a video camera or a compact digital camera, results obtained as above are transferred to the video memory 221 periodically (on a frame-by-frame basis) in a pre-shooting state, whereby a monitor display section 220 performs finder display (live view), etc. In a single-lens reflex digital camera, the image pickup element 212 is shielded from light by the quick return mirror 203 and the focal plane shutter 210 before shooting, so that live-view display cannot be performed.

Therefore, by turning on a live-view mode switch 235, the quick return mirror 203 is moved up to be retreated from the photographic optical path, and then the focal plane shutter 210 is brought into an open state, whereby a live-view operation is enabled. Further, image signals from the image pickup element 212 are processed by the camera DSP 227 or the system controller 230 during live view, whereby it is possible to obtain contrast evaluation values corresponding to the sharpness of an associated image. Thus, the contrast type AF can be performed using the evaluation values.

During shooting, pixel data for each frame is read out from the DRAM 229 based on a control signal from the system controller 230 and is temporarily stored in the work memory 226 after having been subjected to image processing by the camera DSP 227. Then, the pixel data stored in the work memory 226 is compressed by a compression/expansion section 225 based on a predetermined compression format, and the compressed pixel data is stored in an external nonvolatile memory (external memory) 224. In general, the nonvolatile memory 224 is implemented by a flash memory or the like. It may be implemented e.g. by a hard disk or a magnetic disk as well.

A display section 231 connected to the system controller 230 displays a camera operating state configured or selected by switching elements, referred to hereinafter, by a display device, such as a crystal display device, an LED (light emitting diode), or an organic EL. An operation switch 232 is an operating member for use in performing an input operation concerning various configuration items for the camera main unit 200. A release switch SW1 (233) is used to start a shooting preparation operation e.g. in a photometry/focus detection area. A release switch SW2 (234) is used to start a shooting operation (charge storage and charge reading operation). A live-view mode switch is used to control ON/OFF of live-view display.

On the other hand, in the photographic lens 100 as a lens unit, the lens controller 108 is provided with a memory 109. The memory 109 stores performance information on a focal length of the photographic lens 100, an open diaphragm value, and so forth, lens ID (identification) information as unique information for identifying the photographic lens 100, and distance information indicative of a distance from a focus adjustment position to a lens end, which varies with the focus adjustment position. Further, information communicated from the system controller 230 is stored in the memory 109. Although described in detail hereinafter, a plurality of pieces of lens position information are latched according to a storage timing signal from the synchronization signal line during the contrast type AF, and the memory 109 is also used to store the lens position information.

It should be noted that the performance information and the ID information are transmitted to the system controller 230 through initial communication performed upon mounting of the photographic lens 100 to the camera main unit 200, and the system controller 230 causes an EEPROM 223 to store these pieces of information.

Further, the photographic lens 100 is provided with a lens position information detector section 110 for detecting position information on the focus lens 101. A plurality of pieces of lens position information detected by the lens position information detector section 110 are read by the lens controller 108. The lens position information pieces are used to drivingly control the focus lens 101 or sent to the system controller 230 via the electrical contact unit 107.

The lens position information detector section 110 is implemented e.g. by a pulse encoder for detecting the number of rotation pulses of a motor constituting the lens driving mechanism 103. The output of the lens position information detector section 110 is connected to a hardware counter, not shown, within the lens controller 108, and when the focus lens 101 is driven, position information on the same is counted by the hardware counter. The lens controller 108 reads the lens position information by accessing a register of the hardware counter provided therein and reading a counter value stored in the register.

FIG. 2 is a schematic diagram useful in explaining the outline of distance information.

Referring to FIG. 2, it is assumed that the focus lens 101 is now positioned halfway between the closest-distance end and the infinite end, and at a location a distance Nk away from the closest-distance end and a distance Fk away from the infinite end. In this case, paired information consisting of the distance Nk from the closest-distance end and the distance Fk from the infinite end defines section distance information on the position of the focus lens 101, and the section distance information is stored in the lens controller 108 in association with each focus adjustment position. The lens controller 108 recognizes the current position of the focus lens 101 via the lens position information detector section 110 and outputs section distance information associated with the current position of the focus lens 101 as distance information in response to an output request from the camera main unit 200.

Figure 3:
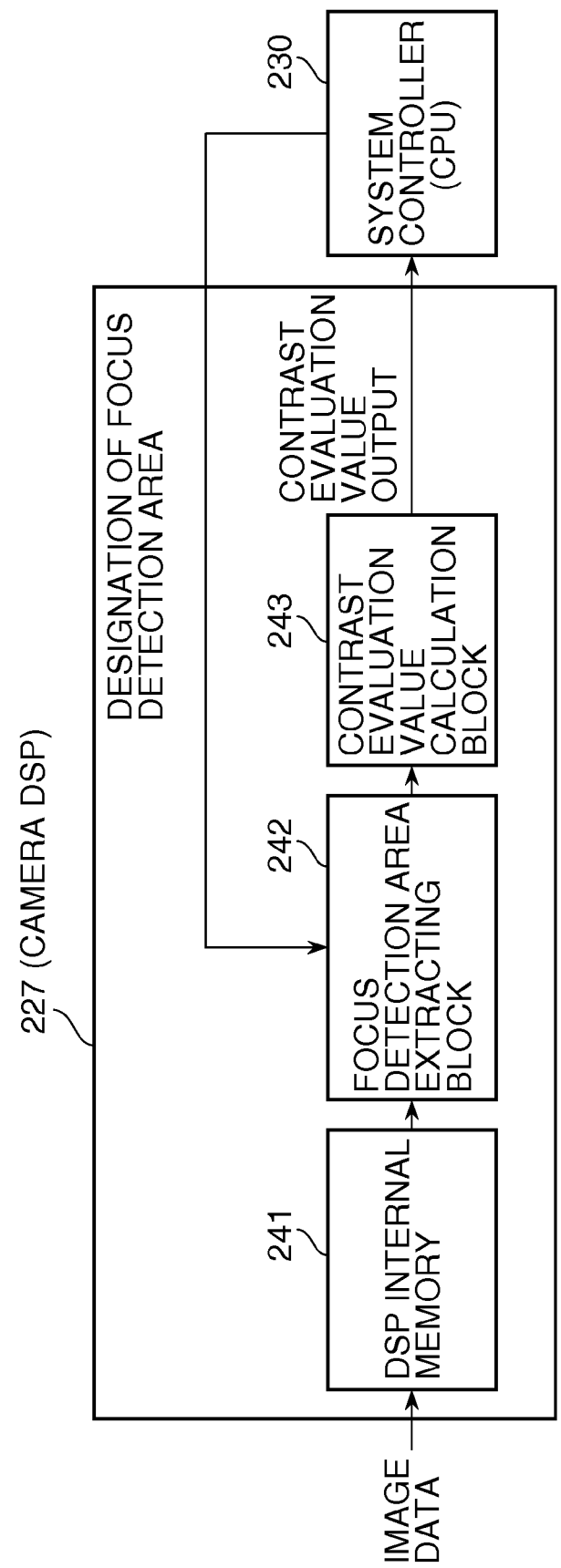
FIG. 3 is a block diagram useful in explaining a contrast evaluation value-calculating circuit of the digital camera as the image pickup apparatus according to the embodiment of the present invention.

Next, the circuit block for contrast value calculation in the camera DSP 227 will be described with reference to FIG. 3.

An electric image signal generated by the image pickup element 212 is amplified by a CDS/AGC circuit 216, and is converted into a digital signal by the A/D converter 217, as described above, and the digitized image data is input to the camera DSP 227 via the selector 222.

In order to calculate a contrast evaluation value associated with a sharpness required for the contrast type AF, first, the image data input to the camera DSP 227 is input to a focus detection area extracting block 242 via a DSP internal memory 241 in the camera DSP 227. The focus detection area extracting block 242 trims full-screen image data to obtain an image only in an area in the vicinity of a main object to deliver the obtained image to a downstream contrast evaluation value calculation block 243. It is preferred that a focus detection area has a size ⅕ to ⅒ as large as the outer frame of the screen in respect of the lengthwise direction. It should be noted that the position of a focus detection area in the screen, and the vertical and lateral sizes of the same can be configured by the system controller 230 via the focus detection area extracting block 242.

Next, the operation of essential parts of the digital camera according to the present embodiment will be described with reference to a flowchart shown in FIGS. 4A and 4B. An AF control process described below is performed under the control of the system controller 230 unless otherwise specified.

Figure 4A:
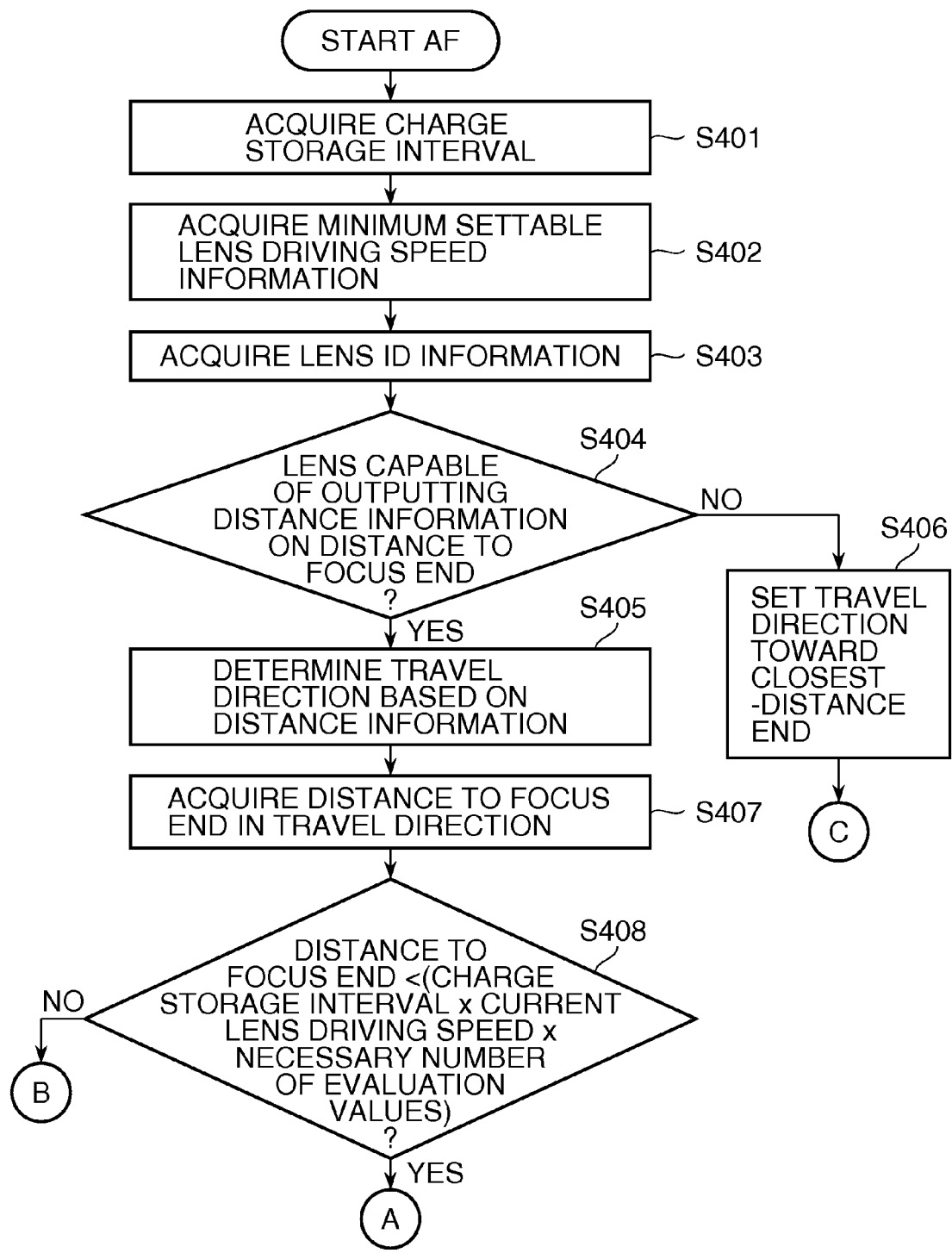
FIGS. 4A and 4B are a flowchart of an AF control process executed by the digital camera as the image pickup apparatus according to the embodiment of the present invention.
Figure 4B:
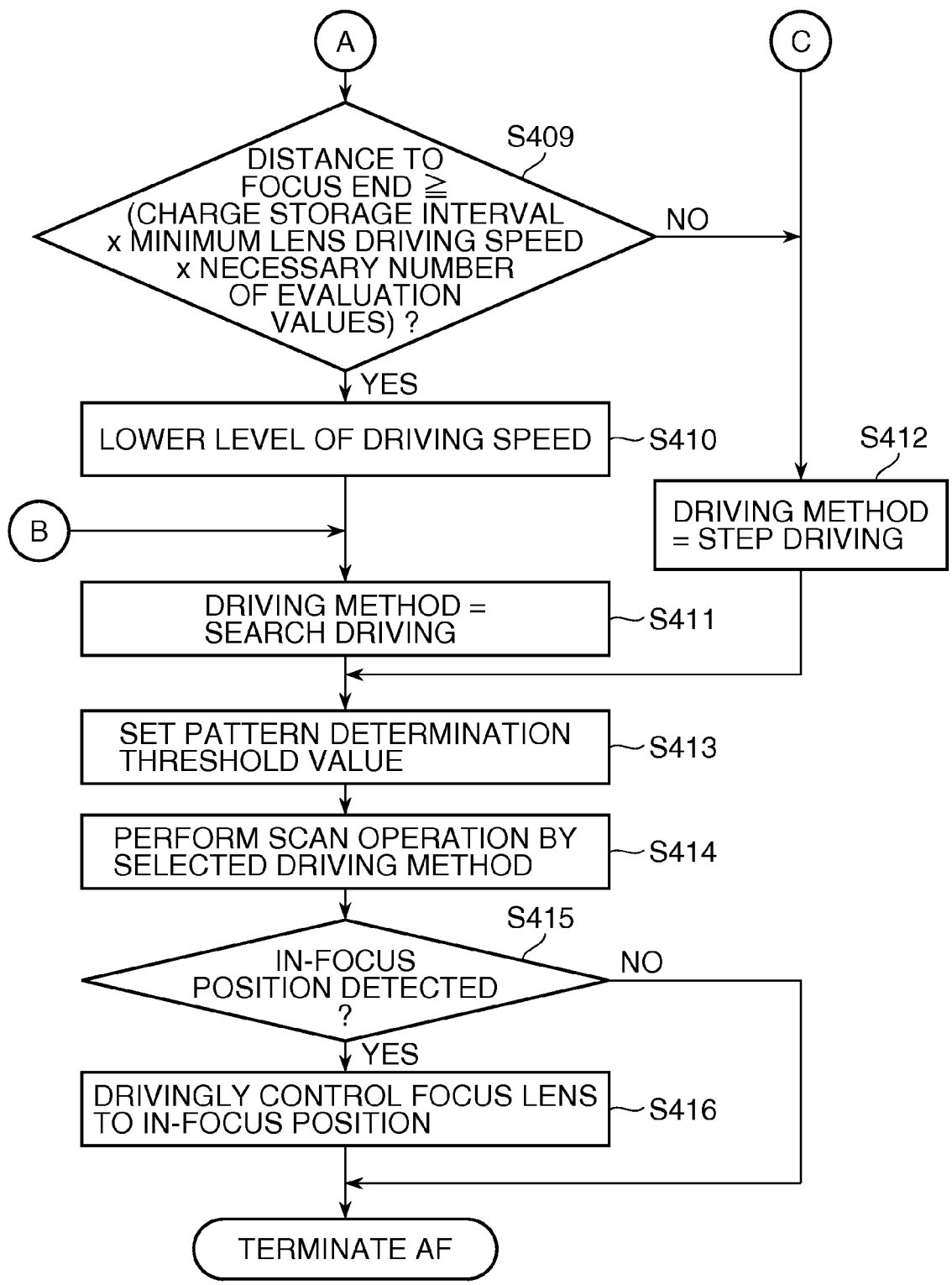

Referring to FIGS. 4A and 4B, this AF control process is started when an AF start command is issued by depression of the release switch SW1. It should be noted that the operation switch 232 may be pressed in place of the release switch SW1. Further, it is assumed that the power of the camera main unit 200 has already been turned on, and the camera main unit 200 is currently performing a live-view operation.

First, in a step S401, information on a charge storage interval of the image pickup element 212 is acquired from the driver 218. Then, in the following step S402, information on a minimum settable lens driving speed is acquired from the lens controller 108. In the following step S403, lens ID information containing information indicative of whether or not the mounted lens (photographic lens 100) is capable of outputting distance information on a distance from the current focus adjustment position to a focus end is acquired.

In the following step S404, it is determined whether or not the lens is capable of outputting distance information on a distance from the current focus adjustment position to a focus end. If the lens is capable of outputting the distance information, the process proceeds to a step S405, wherein a travel direction (moving direction) for scanning according to a predetermined rule is determined based on the distance information. The predetermined rule may be a known algorism, and scanning may be started toward a near focus end (closest-distance end) so as to preferentially autofocus a short-range view or toward a far focus end (infinite end) so as to preferentially autofocus a distant view. After determination of the travel direction, the process proceeds to a step S407, wherein a distance to a focus end in the travel direction is acquired. Then, the process proceeds to a step S408. It should be noted that the distance to the focus end means the distance Nk from the current focus adjustment position to the closest-distance end or the distance Fk from the current focus adjustment position to the infinite end.

On the other hand, if it is determined in the step S404 that the lens is not capable of outputting the distance information, the process proceeds to a step S406. In the step S406, first, it is estimated that there is a higher probability of an object existing on a side toward the closest-distance end, and the travel direction is set toward the closest-distance end. After determination of the travel direction, the process proceeds to a step S412, described hereinafter.

In the step S408 following the step S407, it is determined whether or not the following expression (1) is satisfied:

$$D < T \times Va \times N \qquad (1)$$

This expression (1) is used to determine whether or not it is possible to acquire evaluation values required for contrast evaluation value pattern determination while performing search driving toward a focus end in a travel direction at the current lens driving speed. D represents a distance from the current focus adjustment position to the focus end in the travel direction, T a charge storage time period of the image pickup element 212 for focus detection, and Va the current lens driving speed. Further, N represents the number of evaluation value acquisition positions required for the contrast evaluation value pattern determination (i.e. the necessary number of evaluation values). In the case of simply detecting the maximum value of the evaluation value, N is set to 3 (N=3). In the case of detecting a peak of the evaluation value including values at neighboring focus adjustment positions, N is set to be larger than 3 (N>3). It should be noted that the pattern determination is to determine using, for example, evaluation values at respective three adjacent positions (N=3), whether the evaluation value monotonically increases toward the closest-distance end or the infinite end, or whether the evaluation value has reached its peak (i.e. a convex change in the curve of the evaluation value).

If it is determined in the step S408 that the expression (1) is not satisfied, the process proceeds to a step S411 so as to continue the search driving at the current lens driving speed.

On the other hand, if the expression (1) is satisfied, the process proceeds to a step S409, wherein it is determined whether or not the following expression (2) is satisfied:

$$D \geq T \times Vb \times N \qquad (2)$$

It should be noted that Vb represents a minimum lens driving speed, and D, T, and N represent the same as in the expression (1). The expression (2) is used to determine whether or not it is possible to acquire an evaluation value required for contrast evaluation value pattern determination while performing search driving toward a focus end in a travel direction at the minimum lens driving speed.

If the expression (2) is satisfied, the process proceeds to a step S410, whereas if not, the process proceeds to the step S412.

If it is determined that evaluation values required for contrast evaluation value pattern determination can be acquired by setting the lens driving speed to the minimum lens driving speed Vb, the process proceeds from the step S409 to the step S410, as mentioned above. In the step S410, the lens driving speed is reduced to satisfy the expression (2), and then the process proceeds to the step S411. In the step S411, the search driving method is selected as a lens driving method, and then the process proceeds to a step S413. In the step S413, a pattern determination threshold value suitable for the search driving speed (Va or Vb) is set. The pattern determination threshold value is set to be larger as the search driving speed is higher.

Now, a description will be given of setting of a pattern determination threshold value according to the search driving speed with reference to FIG. 5.

Figure 5:
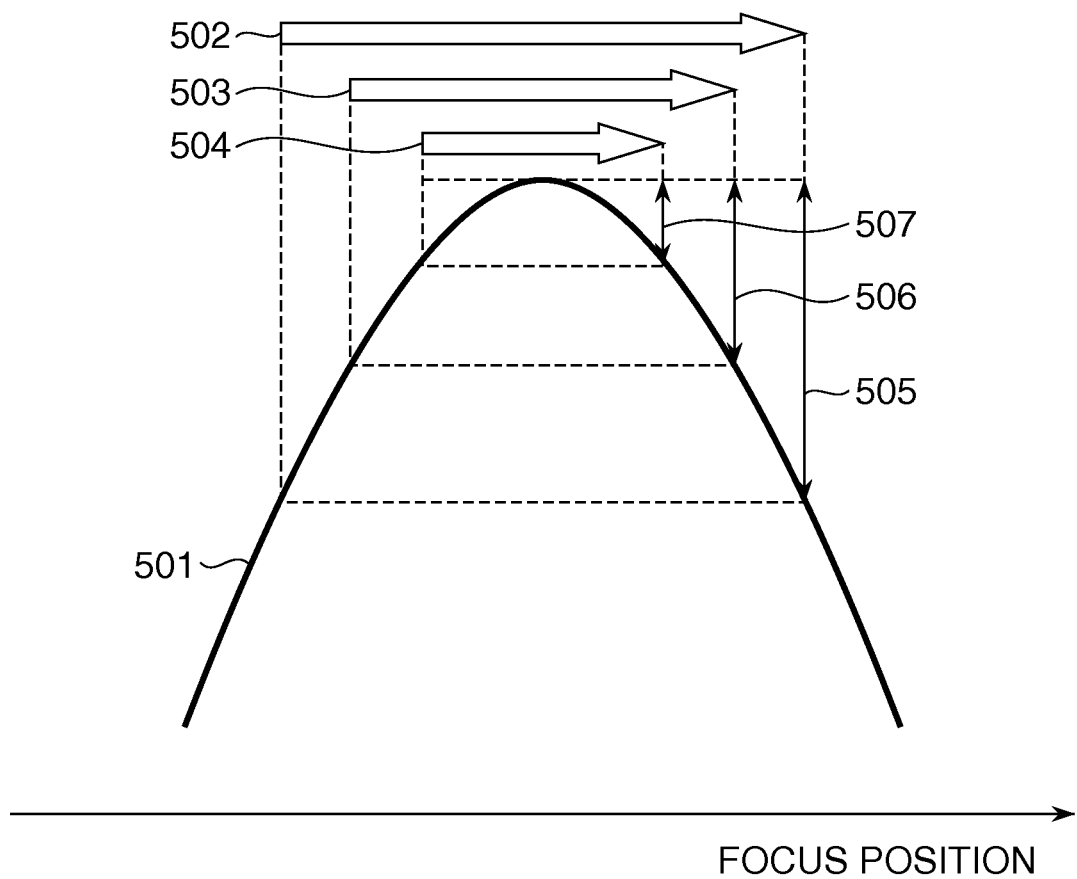
FIG. 5 is a schematic diagram useful in explaining a pattern-determining threshold used by the digital camera as the image pickup apparatus according to the embodiment of the present invention.

In FIG. 5, reference numeral 501 denotes a locus indicative of the maximum value of the contrast evaluation values around an in-focus position. Reference numeral 502 denotes search driving performed at the lens driving speed Va, and the amount of travel per unit time is indicated by the length of an arrow. Reference numeral 503 denotes search driving performed at the lens driving speed Vb which is lower than the lens driving speed Va, and the amount of travel per unit time is indicated by the length of an arrow. Reference numeral 504 denotes step driving, and the amount of travel (driving) per step is indicated by the length of an arrow.

Reference numeral 505 denotes an example of the pattern determination threshold value for evaluation values, and this pattern determination threshold value is set for the search driving performed at the lens driving speed Va, according to the amount of travel per predetermined time period from acquisition of a contrast evaluation value to acquisition of a next one. When the height of the peak of the evaluation value is at least equal to the pattern determination threshold value, it is determined that the peak indicates an in-focus position. More specifically, when the amount of change in the evaluation value exceeds the pattern determination threshold value, the evaluation value at this time is determined as a peak, and when a very sharp peak appears, estimating that no other shaper peak exists, and the peak is finally regarded as one indicative of the in-focus position. In actuality, the pattern determination threshold value is set to a sufficiently large value. Similarly, reference numeral 506 denotes a pattern determination threshold value for evaluation values, which is set for the search driving performed at the lens driving speed Vb, according to the amount of travel per predetermined time period, and reference numeral 507 denotes a pattern determination threshold value for evaluation values, which is set for the step driving, according to the amount of travel per step.

As shown in FIG. 5, each of the pattern determination threshold values 505 to 507 for contrast evaluation values is set for the associated driving according to the amount of travel per predetermined time period from acquisition of a contrast evaluation value to acquisition of a next one.

Referring again to FIG. 4B, after setting the pattern determination threshold value in the step S413, the process proceeds to a step S414. In the step S414, a scan operation is started for performing contrast evaluation while carrying out the search driving selected in the step S411.

On the other hand, in the step S412 following the step S406 or S409, the step driving is selected as the lens driving method so as to obtain an evaluation value without fail at a target position for contrast evaluation value acquisition. After determining the lens driving method, the process proceeds to the step S413, wherein a pattern determination threshold value suitable for the step driving is set. Then, the process proceeds to the step S414, wherein a scan operation is started for performing contrast evaluation while carrying out the step driving selected in the step S412.

In the following step S415, a peak of the contrast evaluation value is detected by the scan operation, and if the evaluation value of the peak is larger than the predetermined peak determination threshold value, it is determined that an in-focus position has been successfully detected. If it is determined that an in-focus position has been successfully detected, the process proceeds to a step S416, and the focus lens 101 is drivingly controlled to the in-focus position, followed by terminating the AF operation. On the other hand, if it is determined in the step S415 that the in-focus position has not been successfully be detected, the present process is immediately terminated.

In the present embodiment, it is determined in the step S409 whether or not it is possible to acquire evaluation values required for contrast evaluation value pattern determination while performing search driving toward a focus end in a travel direction by setting the lens driving speed to the minimum lens driving speed. However, this is not limitative, but whether or not evaluation values required for contrast evaluation value pattern determination can be acquired may be determined in a simplified fashion only based on a distance from the current focus adjustment position to the focus end in the travel direction, or alternatively, only based on the minimum lens driving speed or the currently set lens driving speed. Further, alternatively, whether or not evaluation values required for contrast evaluation value pattern determination can be acquired may be performed only based on the charge storage interval of the image pickup element 212 for focus detection. These variations are suitable for a case where there is mounted an interchangeable lens which are not equipped with all the determination devices used for performing the determination based on the equation (1) or (2) or a case where reduction of processing for information acquisition is desired so as to reduce processing load on the system controller 230.

In the present embodiment, if an interchangeable photographic lens is not capable of outputting distance information on the distance to a focus end, the step driving method is selected as a lens driving method without exception. However, even when the interchangeable photographic lens is not capable of outputting distance information on a distance to a focus end, if information on a whole focus movable range from the closest-distance end to the infinite end is available, it may be simply determined, based on the length of the whole focus movable range, whether or not evaluation values required for contrast evaluation value pattern determination can be acquired.

Further, in the present embodiment, the lens controller 108 outputs distance information corresponding to the current position of the focus lens 101 as a defocus amount. However, this is not limitative, but a method may be configured such that the distance information is indicated by a numerical value (drive pulse count) based on the count of the hardware counter, not shown, within the lens controller 108, and the numerical value is output to the camera main unit 200. In this case, the numerical value may be decoded into a defocus amount by the system controller 230. This makes it possible to simplify the construction of the interchangeable photographic lens 100, so that a reasonable system configuration can be realized when a plurality of photographic lenses 100 are provided for a single camera main unit 200.

As described above, according to the present embodiment, the lens-interchangeable image pickup apparatus to which an interchangeable lens can be mounted is provided with a focus detecting function of the contrast type for detecting an in-focus position based on contrast evaluation values. In this type of image pickup apparatus, at least one of a drivable defocus amount of an interchangeable lens and a driving speed with respect to a focus adjustment position of a focus lens is acquired from the interchangeable lens mounted to the image pickup apparatus. Then, the lens driving method for focus detection is changed based on at least one of the drivable defocus amount, the lens driving speed, and the charge storage interval of the image pickup element 212 for acquiring signals for use in focus detection. It should be noted that the lens driving method is intended to generically mean the search driving method as a first driving method in which lens driving is continued until stoppage of the lens driving is requested, or the step driving method as a second driving method in which lens driving is performed by an amount corresponding to a requested drive value.

Specifically, the following determination is performed for execution of the contrast type AF: It is determined whether or not contrast evaluation values can be acquired at respective desired focus adjustment positions during lens driving based on at least one of the drivable defocus amount of the mounted interchangeable lens, the lens driving speed, and the charge storage interval of the image pickup element 212 (step S409). It should be noted that "desired focus adjustment positions" mean positions (interval) desired for enabling evaluation value acquisition to be performed at defocus distance intervals fine enough not to skipping the reading of a peak during the pattern determination. The equation (2) is used so as to determine whether or not contrast evaluation values can be acquired at a desired focus adjustment position during search driving. When it is determined that the contrast evaluation value acquisition is impossible, the lens driving method is switched to the step driving (intermittent driving) method as the second driving method in which lens driving can be accurately stopped at a target contrast evaluation value acquisition position (steps S409 to S412).

On the other hand, when the contrast evaluation value acquisition is possible, the driving speed is lowered (step S409 to S411), whereby search driving, i.e. lens driving by the first driving method, is performed. In other words, the lens driving speed for shifting the focus adjustment position can be selected from a plurality of speeds, and therefore when contrast evaluation values can be acquired at desired focus adjustment positions, the lens driving speed for shifting the focus adjustment positions by the first driving method is changed.

The drivable defocus amount is intended to mean a defocus amount up to a focus drive limit (focus end) in a focus driving direction during focus detection, or a defocus amount in the whole focus movable range (from the closest-distance end to the infinite end) during focus detection.

The photographic lens 100 outputs a drive value (drive pulse count) up to the focus drive limit (focus end) in the focus driving direction during focus detection, and the camera main unit 200 acquires the drive value and calculates the drivable defocus amount based on the drive value.

The image pickup element 212 used to pick up still images is also used as a sensor means for acquiring signals for use in focus detection.

The threshold value for use in detection of an in-focus position is changed in accordance with switching between the lens driving methods.

Thus, the present embodiment makes it possible to accurately acquire contrast evaluation values at desired focus adjustment positions, and therefore it is possible to provide a digital camera which is capable of suppressing degradation of accuracy of autofocus due to skipping the reading of a contrast evaluation value at an in-focus position, and an increase in autofocus time.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-316330, filed Dec. 12, 2008, which is hereby incorporated by reference herein in its entirety.

What is claimed is:

1. A lens-interchangeable image pickup apparatus having a focus detection unit for detecting an in-focus position for an object based on contrast evaluation values, the image pickup apparatus comprising:

an acquisition unit configured to acquire, from an interchangeable lens of the image pickup apparatus, first information of a distance up to a focus drive limit in a focus driving direction during focus detection, and second information of a focus driving speed; and a controller configured to change a lens driving mode for focus detection, based on the first information, the second information, and third information of a charge storage interval for charge storage in a sensor for acquiring a signal for use in focus detection, wherein the lens driving mode includes a first driving mode in which lens driving is continued until stoppage of the lens driving is requested, and a second driving mode in which lens driving is performed by an amount corresponding to a requested drive value, and wherein the controller sets, when the interchangeable lens is determined to not provide the first information, the lens driving mode during the focus detection as the second driving mode.

2. The image pickup apparatus according to claim 1, wherein said acquisition unit acquires, when the interchangeable lens is determined to not provide the first information, the first information and the second information in an entire focus movable range during the focus detection, from the interchangeable lens.

3. The image pickup apparatus according to claim 1, wherein said acquisition unit acquires a drive value up to the focus drive limit in the focus driving direction during focus detection, from the interchangeable lens, and calculates the first information based on the acquired drive value.

4. The image pickup apparatus according to claim 1, wherein said controller selects one of the first driving mode or the second driving mode, based on the third information.

5. The image pickup apparatus according to claim 1, wherein said focus detection unit changes a threshold value for use in determining of a peak of contact evaluation values in accordance with changing of the lens driving mode by said controller.

6. The image pickup apparatus according to claim 1, wherein said controller changes the focus driving speed in the first driving mode based on the first information, the second information, and the third information.

* * * * *